United States Patent
De Marchi

(10) Patent No.: US 6,550,978 B2
(45) Date of Patent: Apr. 22, 2003

(54) PLUG PART FOR AN OPTICAL PLUG-AND-SOCKET CONNECTION AND METHOD FOR ITS ASSEMBLY

(75) Inventor: Silverio De Marchi, Ascona (CH)

(73) Assignee: Diamond S.A., Losone (CH)

( * ) Notice: Subject to any disclaimer, the term of this patent is extended or adjusted under 35 U.S.C. 154(b) by 89 days.

(21) Appl. No.: 09/754,080

(22) Filed: Jan. 5, 2001

(65) Prior Publication Data
US 2001/0014197 A1 Aug. 16, 2001

(30) Foreign Application Priority Data
Jan. 6, 2000 (EP) .......................................... 00810007

(51) Int. Cl.[7] .............................. G02B 6/38; G02B 6/36
(52) U.S. Cl. .............................. 385/60; 385/78; 385/76; 385/139
(58) Field of Search .............................. 385/53, 76–78, 385/81, 139, 58, 60

(56) References Cited

U.S. PATENT DOCUMENTS 5,809,192 A * 9/1998 Manning et al. .............. 385/76
6,019,520 A * 2/2000 Lin et al. ...................... 385/60
6,224,270 B1 * 5/2001 Nakajima et al. ............. 385/55

FOREIGN PATENT DOCUMENTS

WO 93/13442 7/1993
WO 95/35520 12/1995

* cited by examiner

*Primary Examiner*—Hemang Sanghavi
*Assistant Examiner*—Omar Rojas
(74) *Attorney, Agent, or Firm*—Shoemaker and Mattare

(57) ABSTRACT

A plug part (1) for an optical plug-and-socket connection includes a plug housing (2) and at least one plug pin (3) which is held rotationally fixed in the plug housing on a pin mounting (4). The pin mounting at the same time is under axial spring bias. It is held rotationally fixed in a sleeve (6) which is fastened on a cable-side housing terminal part (7). A positioning section (8) permits the fixing of the radial relative position on a complementary positioning section on the plug housing (2). The optimal relative position is with this previously evaluated with a measuring adapter. The thus formed cable terminal unit (26) may thus be easily assembled and handled and manufactured with a fiber optic cable.

13 Claims, 9 Drawing Sheets

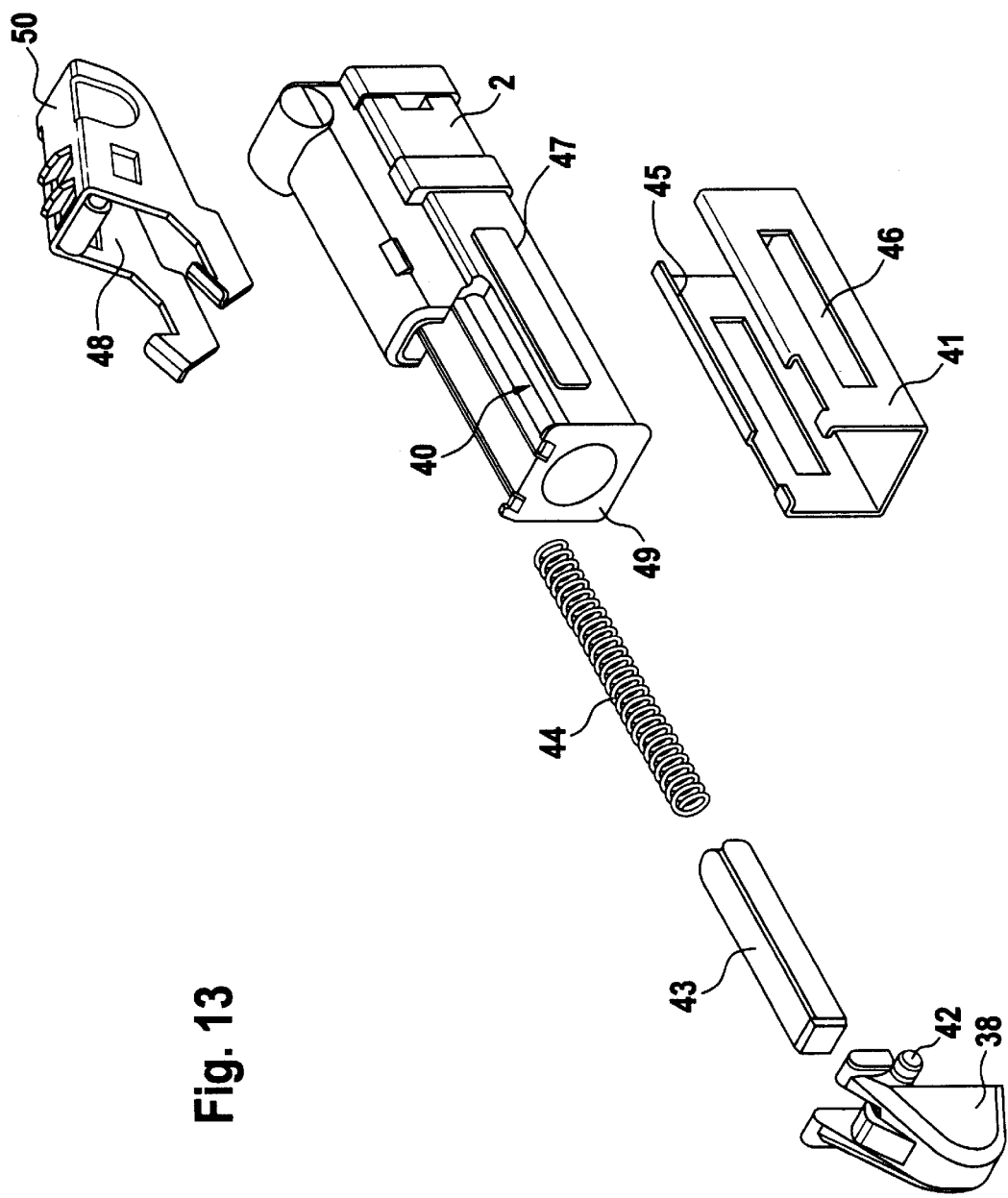

PLUG PART FOR AN OPTICAL PLUG-AND-SOCKET CONNECTION AND METHOD FOR ITS ASSEMBLY

BACKGROUND OF THE INVENTION

The invention relates to a plug part for an optical plug-and-socket connection in which there is an axial spring bias on the plug pin, so that when the plug part is inserted into a socket, light transmission is insured, even when there are tolerance deviations, or there is a pull on the cable.

With spring mounted plug pins, it is already known to apply the pin mounting at a certain radial relative position in the housing, in which the most optimal transmission damping is achieved. In spite of a high precision with the encasing of an optical fiber in a plug pin there exist specifically deviations with respect to the concentricity. By measuring out the optimal relative position a high reproducibility of the transmission damping is achieved.

Swiss Patent A-689 316 discloses an optical plug with which the pin mounting is formed as a splined shaft which in six different angular positions is insertable into the inner side of the plug housing, which is formed as a spline bore hub. A spring element in the form of a skeleton-like interrupted hollow cylinder section is directly integrated into the pin mounting. The pin mounting also forms a cable-side terminal part for accommodating the bend protection. Such a one-piece design of the pin mounting, however, is not suitable for all plug types. Furthermore the manufacture of the fiber optic cable with the pin mounting is relatively complicated.

SUMMARY OF THE INVENTION

It is therefore the object of the invention to provide a plug part of the initially mentioned type which permits a simple assembly of the plug part and in particular a simple manufacture of the fiber optic cable. Furthermore the plug pin and the plug mounting are to be precisely guided and pre-positioned. According to the invention this object is achieved with a plug part as described below.

The sleeve of this invention in a simple manner forms a means for the rotationally fixed and axially displaceable mounting of the pin mounting as well as for its connection to a cable-side housing terminal part. While the radial position of the pin mounting relative to the sleeve does not play any role, the definitive fixing of the radial relative position is effected on a positioning section on the housing terminal part, which corresponds to a complementary positioning section on the plug housing. The design with the sleeve as a connection element permits also the incorporation of spring elements with different spring forces. Installing the plug at the end section of a fiber optic cable is relatively simple because the pin mounting may be held relatively short and therefore can be handled well.

Particularly advantageously the sleeve is snapped onto the housing terminal part in a rotationally fixed manner. This assembly requires neither tools nor adhesives or the like and the whole unit is easily disassembled again.

For a rotationally fixed mounting in the sleeve the pin mounting may comprise at least one guiding groove which cooperates with a guide element on the sleeve. The spring bias is preferably provided by a helical compression spring which is held in the sleeve between a support shoulder on the pin mounting and an end face of the housing terminal part. At the same time, the sleeve protects the helical compression spring from mechanical effects and from contamination before the final installation of the preassembled unit into the plug housing.

The sleeve may also comprise latching means for securing the housing terminal part in the selected relative position and which is latchable into the plug housing. For this purpose the plug housing may comprise at least two recesses and the latching means may comprise a number of latching tongues which corresponds to the number of possible relative positions of the housing terminal part. In each relative position, at least two latching tongues latch into the corresponding recesses. Of course, a different securement of the housing terminal part in the plug housing would also be conceivable, such as e.g. by screwing, the application of a cotter pin or by an adhesive.

The sleeve is preferably manufactured as a hollow cylindrical bent piece of metal. For this, a sheet metal is first punched out and provided where appropriate with the necessary edgings. Subsequently the sheet metal blank is rolled into a sleeve. Alternatively, the sleeve could be made from a metal tube or as an injection molded part of plastic.

A particularly precise positioning of the pin mounting may be achieved when the mounting comprises a bearing section formed as a truncated pyramid and when the counter bearing on the plug part is formed as a complementary hollow truncated part, the number of side surfaces of the truncated pyramid corresponding to the number of possible relative positions of the housing terminal part. This way, the radial relative position of the plug pin in the uninserted condition, i.e. shortly before contact with the plug counterpiece, is precisely fixed. In the inserted condition, the truncated pyramid lifts from the complementary hollow truncated part and after pulling out returns again into the precise original position. The base of the truncated pyramid may form an abutment which, for limiting the maximum possible spring path on the pin mounting, cooperates with the end face of the sleeve. The positioning section on the housing terminal part may be formed as a hexagon, wherein for example six radial relative positions of the pin mounting in the housing are possible. Accordingly also the truncated pyramid and the complementary hollow truncated part comprise six surfaces.

Independently of the mounting of the pin mounting in the plug housing on a comparable plug part of the known type, further advantages occur when a protective flap, for protecting the end-face of the plug pin, is pivotably and displaceably mounted on a guide path on the plug housing such that upon inserting the plug part into a socket part, the protective flap is movable from a closure position on the end-face of the plug housing into an opening position displaced back relative to the end-face. A guide element fastened on the plug housing simultaneously forms the guide path for the protective flap or is a constituent part of this guide path. This avoids having to work the whole guide path into the plug housing, which in particular with injection molded parts demands complicated tools and an additional material requirement. The guide element may be formed as a U-shaped bow which is snapped onto the plug housing and surrounds this at least partly. Such a bow of sheet material may be easily manufactured and additionally protects the plug part from mechanical effects.

The invention finally concerns also a method for assembly of the plug part. This assembly method permits a simple preassembly of the cable connection units which possibly only are introduced into the plug housing at the customer's. The measuring out of the optimal relative position is with this effected at the manufacturer's, wherein by way of a suitable marking for the end assembly no additional measures are required.

BRIEF DESCRIPTION OF THE DRAWINGS

Further individual features and advantages of the invention result from the subsequently described embodiment example and the the drawings. There are shown:

FIG. 13 is a perspective representation of further housing-side components before the assembly.

DESCRIPTION OF THE PREFERRED EMBODIMENT

Figure 1:
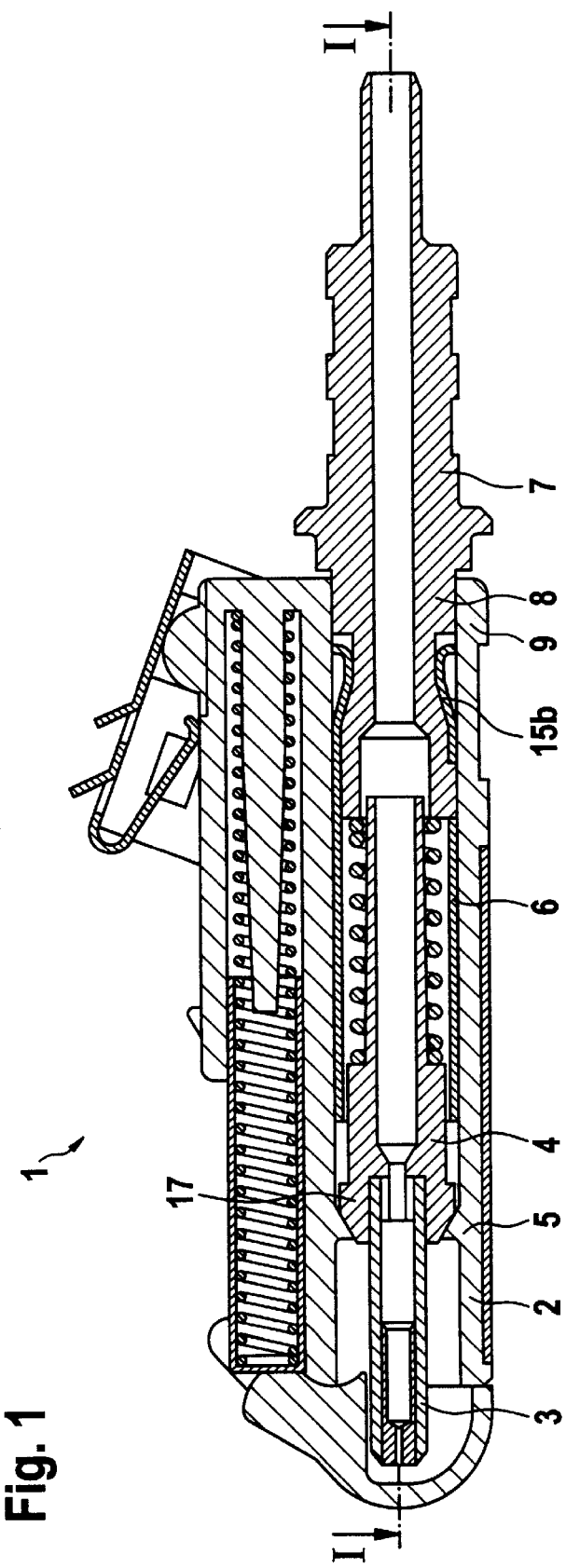
FIG. 1 is a cross section through the plug part according to the invention.
Figure 2:
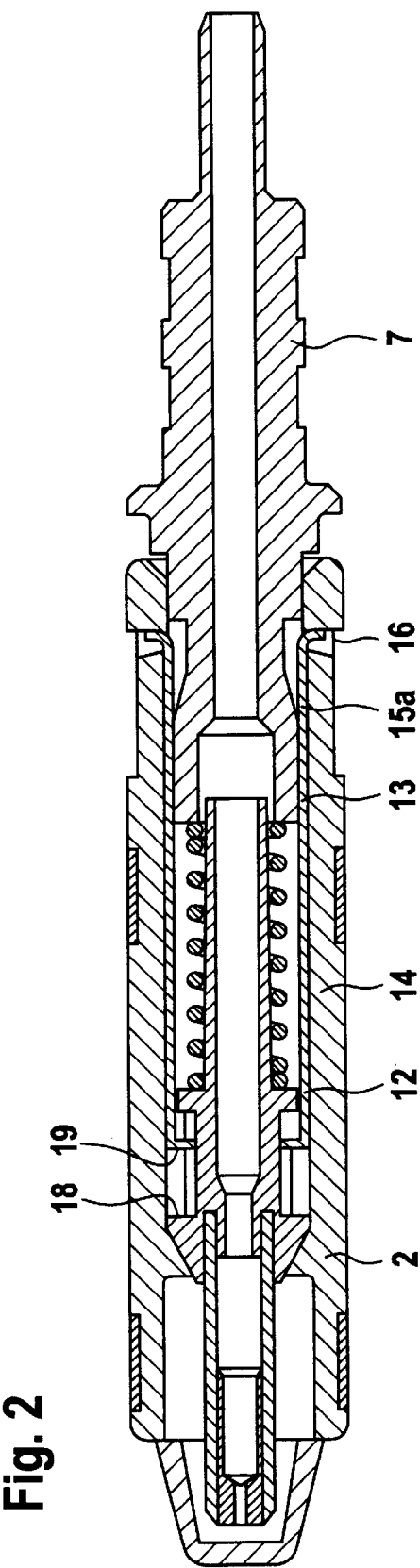
FIG. 2 is a section through the plane I—I on the plug part according to FIG. 1 with the pin mounting in the rest position.
Figure 3:
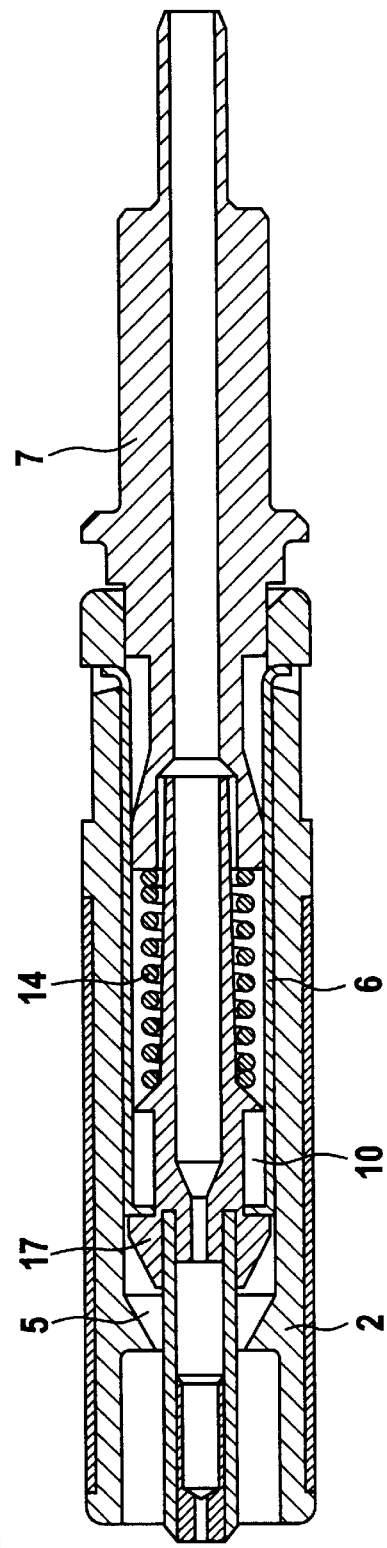
FIG. 3 is a section through the plane I—I on the plug part according to FIG. 1 with a pin mounting pushed back against the spring force.

According to FIGS. 1 to 3, a plug part 1 includes a plug housing 2, for example of plastic material. In the plug housing there is fastened a plug pin 3 for example of ceramic material in a pin mounting 4. In certain cases it would however also be conceivable for the plug pin and plug mounting to be formed as one piece from the same material. The pin mounting is mounted in a sleeve 6 in an manner which is rotationally fixed and axially displaceable against the force of a helical compression spring 14. This sleeve is for its part connected to a housing terminal part 7 in a way and manner described in more detail below.

The pin mounting 4 is provided with a bearing section 17 which is pressed against a complementary counter bearing 5.

FIG. 3 shows the plug pin pushed back against the spring force, wherein the bearing section 17 is lifted from the counter bearing 5. This position is reached when the plug is inserted into a socket part (which is not shown here) and at the same time the plug pin meets a plug counter-piece. With this it may often be the case of a similar type of plug pin or also an optical element for transmitting or receiving light.

The radial relative position between the housing terminal part 7 and the plug housing 2 is fixed by a positioning section 8 which at different angular positions is applicable into a complemental positioning section 9 on the plug housing. The securement of the housing terminal part in the plug housing 2 is effected by latching tongues 15a, on the sleeve 6, which latch into recesses 16 on the plug housing.

Figure 4:
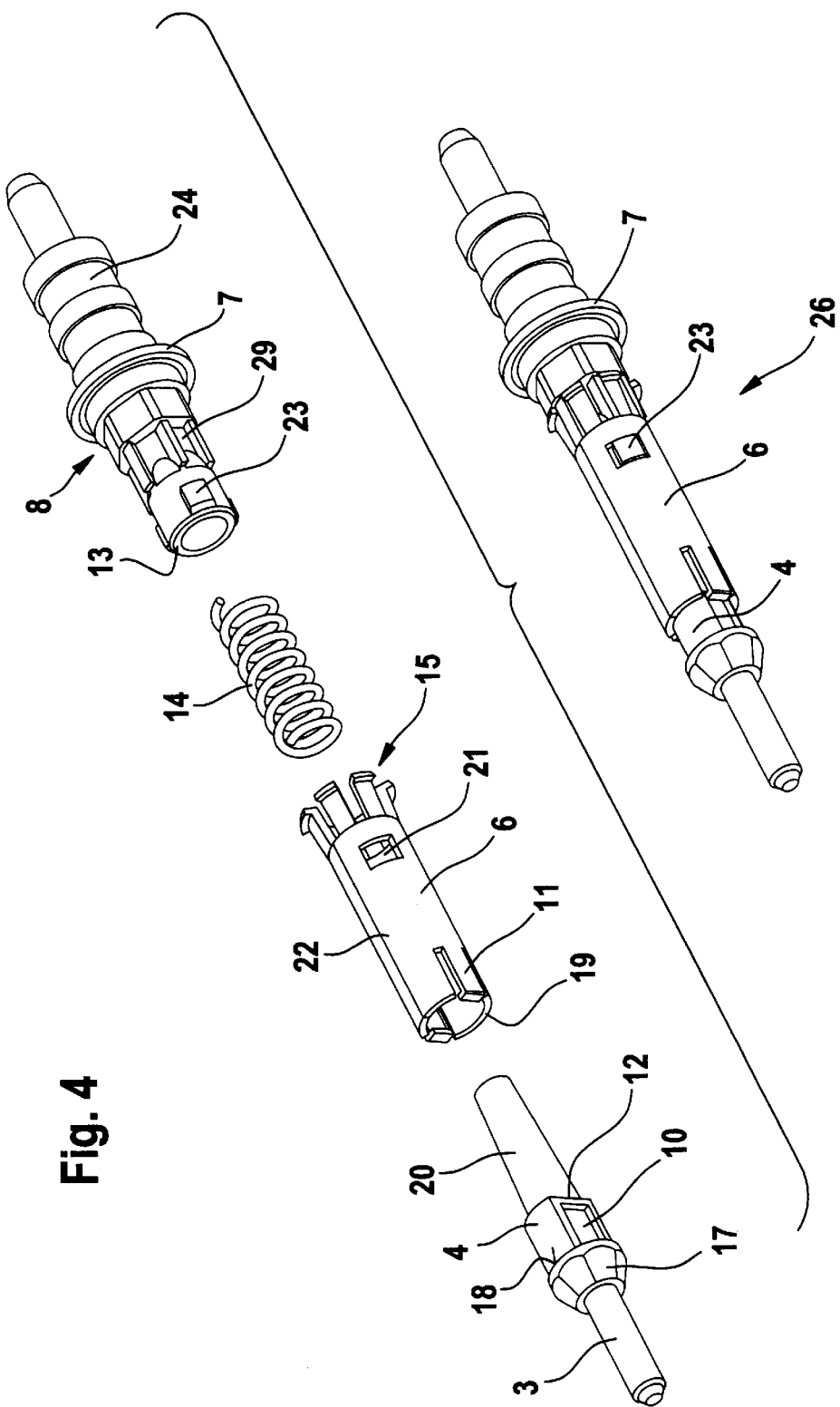
FIG. 4 is a perspective representation of a cable connection unit in the disassembled and assembled condition.

Further details of the mounting and positioning of the pin mounting 4 are shown in FIGS. 4 to 9. FIG. 4 shows a cable terminal unit 26 which includes a pin mounting 4, a sleeve 6, a helical compression spring 14 and a housing terminal part. These parts are assembled merely by latching them together, without requiring additional fasteners.

On the pin mounting 4 it is clearly visible how the bearing section 17 is formed as a truncated pyramid with several lateral side surfaces. The broad base of the truncated pyramid on the rear side forms an abutment for limiting the axial spring travel. This abutment cooperates with the end-face 19 of the sleeve 6. The pin mounting 4 has at its disposal two guiding grooves 10 running parallel and in the direction of the axis. These cooperate with the guide elements 11 which are formed as a pair of guide fingers bent at an angle. A cable receiving sleeve 20 serves for cementing in place the fiber optic cable freed from the outer casing into the pin mounting 4. The pin mounting 4 may be manufactured as an injection molded part of plastic material.

The sleeve 6 is provided with six resilient latching tongues 15 which are arranged with the same angular separation on the circumference. As is particularly evident from FIG. 9 likewise with the same angular separation there are distributed three latching windows 21 over the circumference. These latching windows serve for latching the sleeve 6 on the latching cams 23 of the housing terminal part 7. The abutment seam 22 on the rolled sleeve 6 is arranged such that it lies between two of the latching tongues 15. With a latched-in sleeve the helical compression spring 14 is biased between the end-face 13 of the housing terminal part 7 and the protective shoulder 12 on the pin mounting 4.

Figure 5:
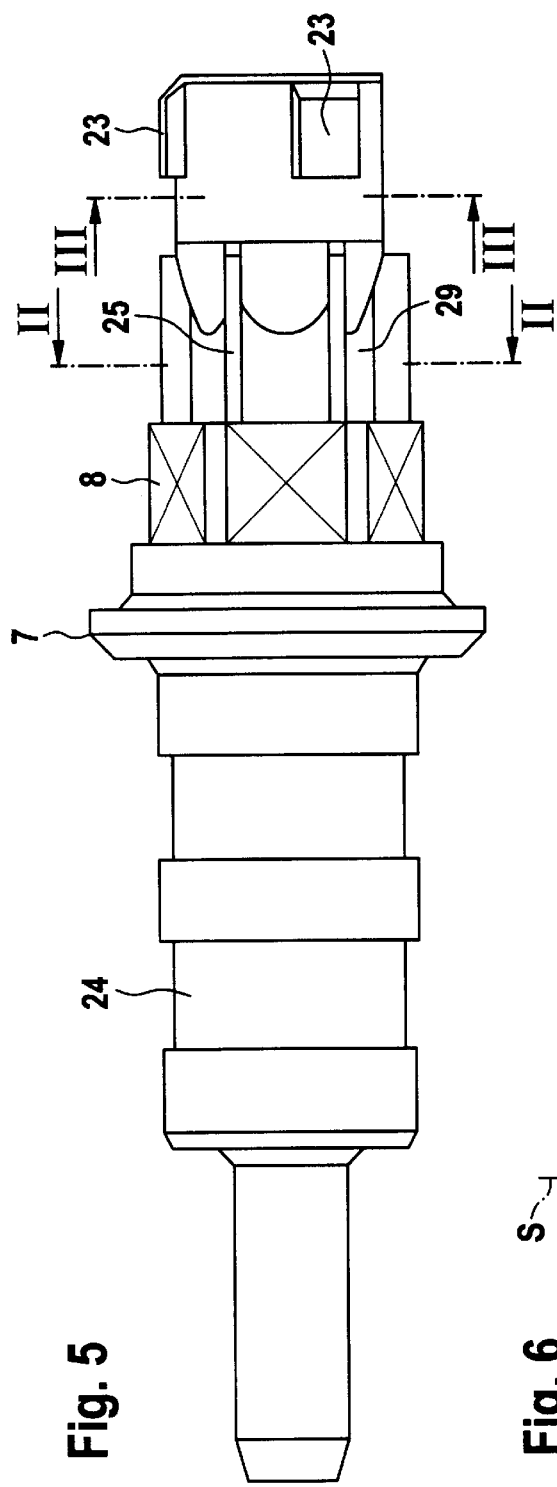
FIG. 5 is a lateral view of a housing terminal part in a greatly enlarged representation.
Figure 7:
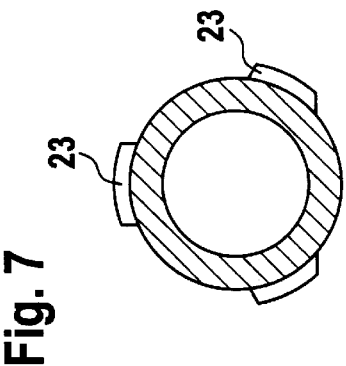
FIG. 7 is a section through the plane III—III on the housing section according to FIG. 5.
Figure 6:
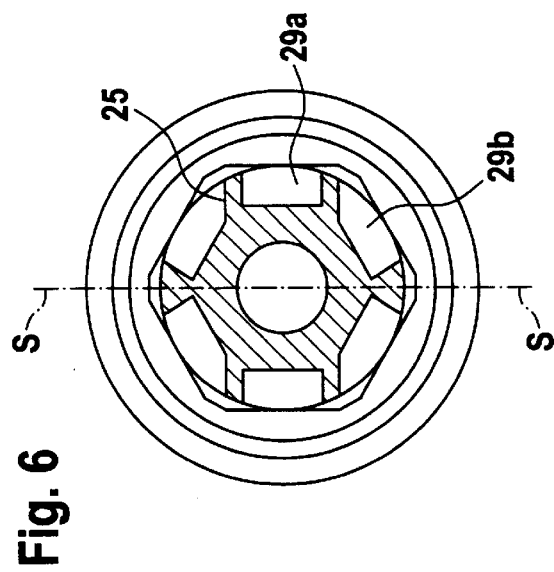
FIG. 6 is a section through the plane II—II on the housing terminal part according to FIG. 5.
Figure 8:
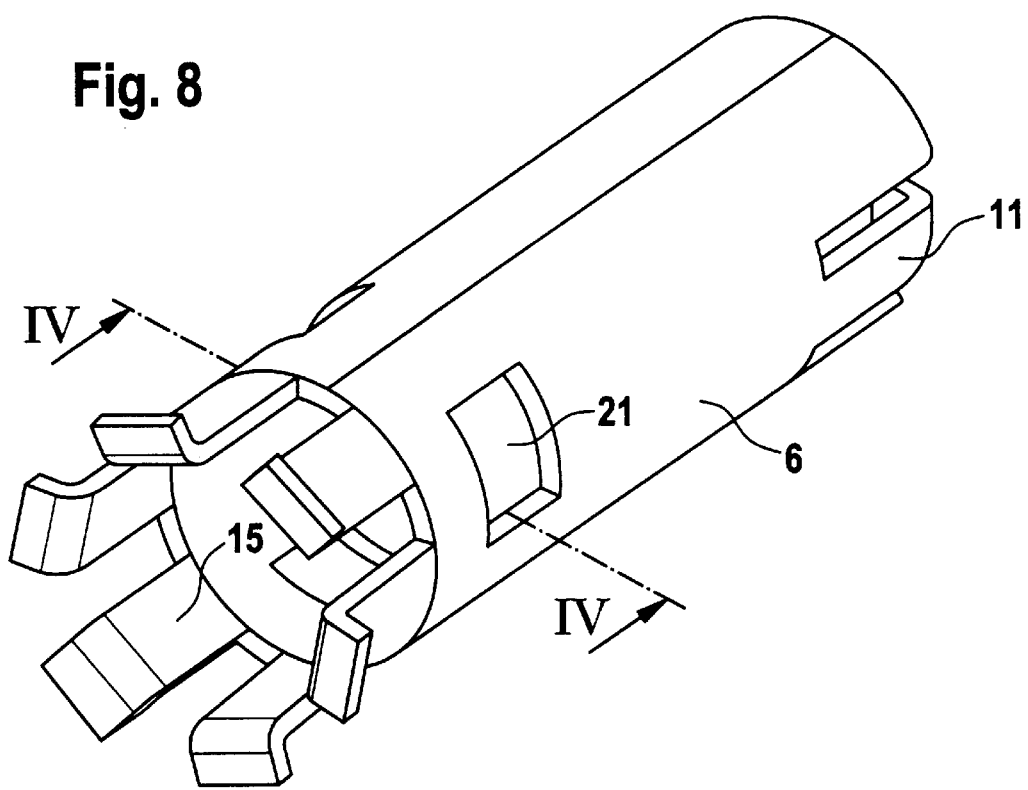
FIG. 8 is a perspective representation of a sleeve.
Figure 9:
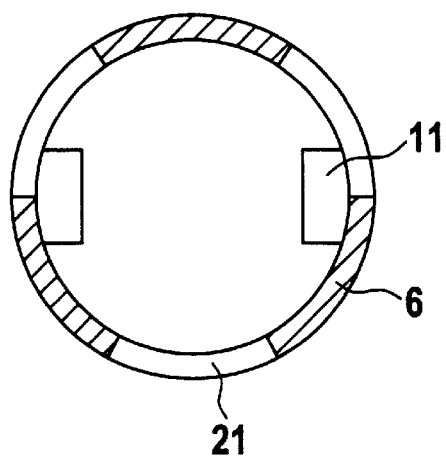
FIG. 9 is a section through the plane IV—IV of the sleeve according to FIG. 8.

Design details of the housing terminal part are evident from the FIGS. 5 to 7. Directly connected to the section with the latching cams 23 there is arranged a spline bore hub-like section which comprises six tongue recesses 25 distributed over the circumference. As is evident from FIG. 6 the tongue guides 25 for reasons of injection molding technology, for a better removability from the mold, are not arranged rotationally symmetrically, but mirror symmetrically with respect to the symmetry axis S.

The tongue recesses 29 accommodate the latching tongues 15 of the sleeve 6 and permit the springing back on inserting into the plug housing. As is evident from the FIGS. 1 and 2 the latching tongues 15a latch into the recesses 16 on the plug housing 2. With this it is the case of the latching tongue pair which is mounted in the tongue recesses 29a (FIG. 6). The remaining latching tongues 15b which are mounted in the tongue recesses 29b on the other hand remain in the bent back position in the recesses (FIG. 1).

Figure 10:
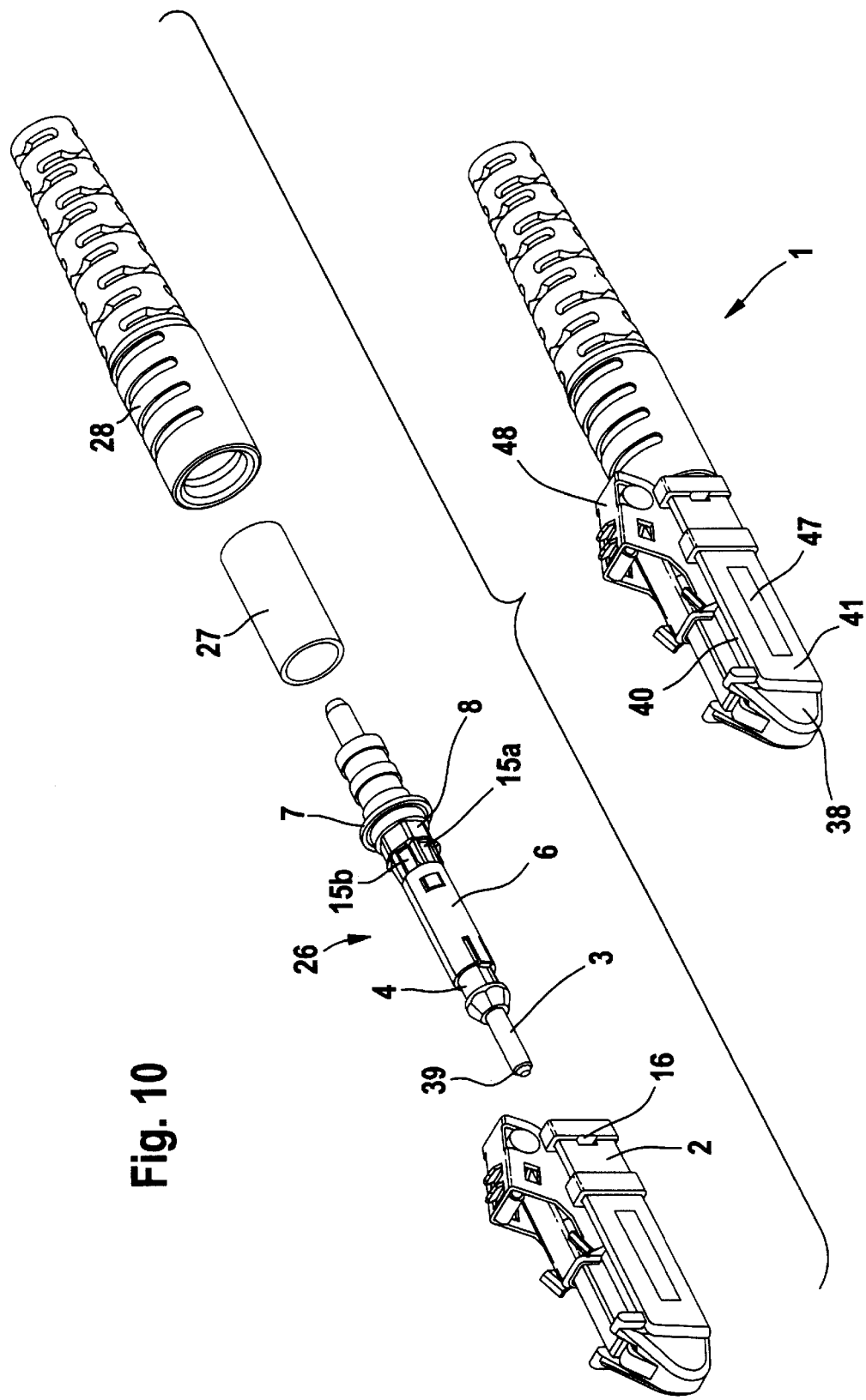
FIG. 10 is a perspective representation of a plug part in the disassembled and in the assembled condition.

The positioning section 8 on the housing terminal part 7 is formed as a hexagon, wherein the individual hexagon surfaces correspond with the tongue recesses 29. A crimp section 24 permits the fastening of a crimp sleeve as is shown in FIG. 10. Also the bend protection 28 for the cable is fixed on the housing terminal part 7.

Figure 11:
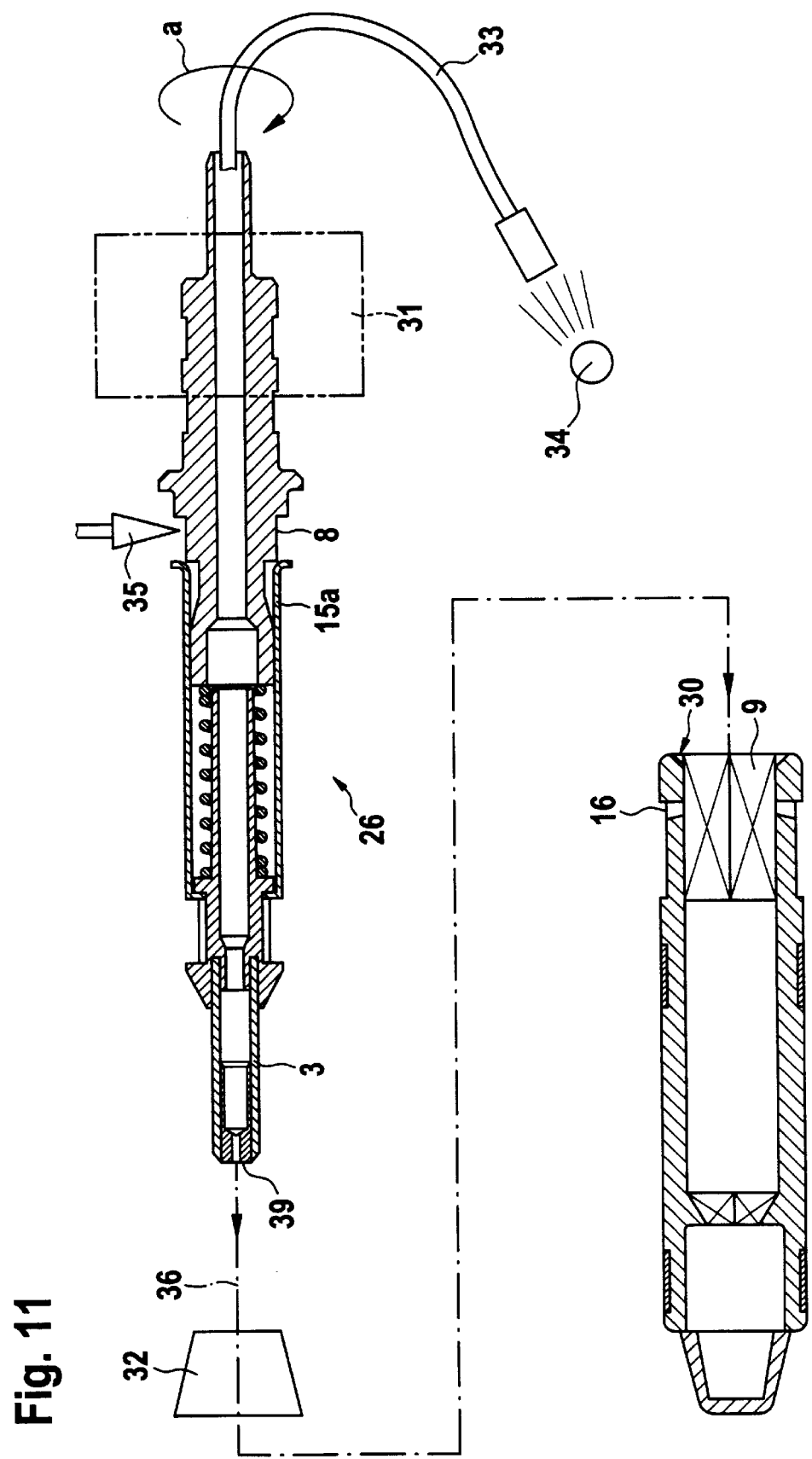
FIG. 11 is a cross section through a plug housing and through a cable terminal unit before the end assembly.
Figure 12:
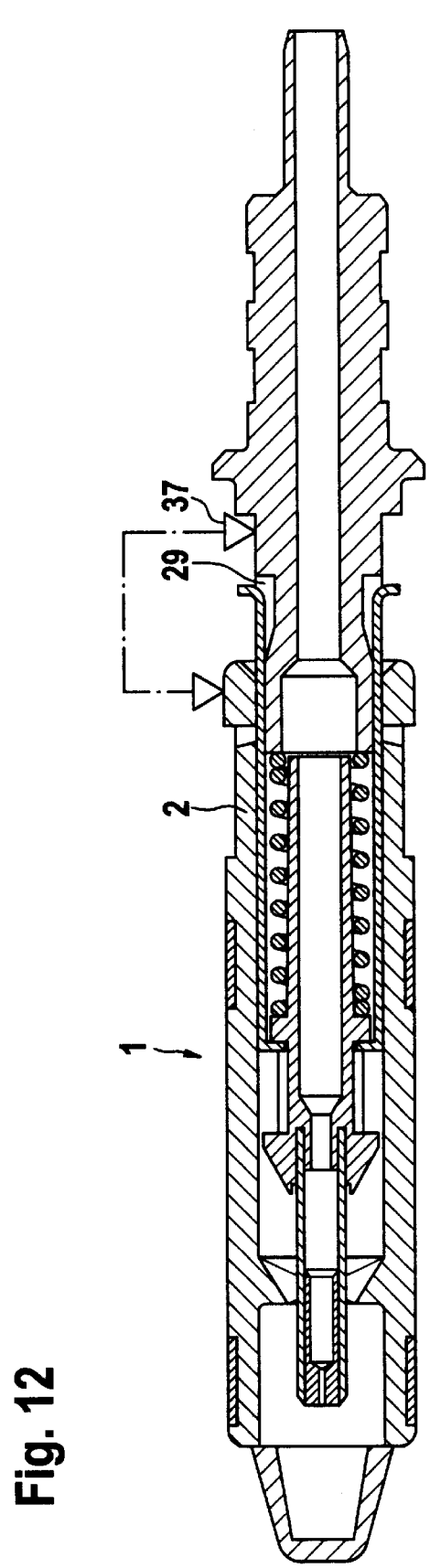
FIG. 12 shows the components according to FIG. 11 on assembly shortly before reaching the end position.

FIGS. 11 and 12 illustrate the end assembly of a plug part 1. The preassembled cable terminal part 26 installed on a fiber optic cable 33 is fixed in a manipulator 31. For reasons of a better overview the fiber optic cable within the cable terminal unit 26 is not shown. In reality the actual fiber optic is led up to the end-face 39 of the plug pin 3. Via a light source 34 light is fed into the cable 33. The light exit at the end-face 39 is measured at a measuring adapter 32 and specifically with respect to the concentricity to the optical axis 36. The manipulator 31 rotates the cable terminal unit 26 in the arrow direction a about the optical axis 36 after one another in all six possible radial relative positions, wherein the transmission damping, i.e. the possible transmission loss on account of a present eccentricity is measured at each position. In the position with the lowest transmission damping, with a marker 35 a marking is made on the cable terminal unit 26. For the end assembly this marking must coincide with a marking, on the plug housing 2, which is continuously present at the same location. In this position the positioning section 8 is introduced in the complementary positioning section 9. Bevels permit the bending back of the latching tongues 15 into the tongue recesses 29. The whole procedure may be carried out manually or be automated.

FIG. 13 shows further components of the plug part which serve the protection of the plug end-face and the latching of the plug part in a socket part. For this there is in particular a protective flap 38 which on lateral linkage cams 42 is pivotably and displaceably mounted in a guide path 40. This guide path is partly formed by the upper side of the plug housing 2 and partly by a guide element 41 which comprises inwardly protruding edges 45.

The guide element 41 is designed as a U-shaped bent part of metal, wherein in the parallel U-limbs in each case there is arranged a latching window 46. In each case a lateral strip 47 on the plug housing 2 latches into this latching window, as is particularly evident also from FIG. 10. The protective flap 38 with a compression spring 44 and with a plunger 43 is biased into the closure position and thus pressed against the end-face 49 of the plug housing 2. The opening of the protective flap 38 is effected by insertion into a socket part.

On the plug housing is furthermore snapped a locking bow 38 with whose help the whole plug part may be latched pull-proof on a socket part. For pulling out the plug part the locking bow 48 on a grip piece 50 must be pressed down.

What is claimed is:

1. A plug part (1) for an optical plug-and-socket connection with a plug housing (2) and with at least one plug pin (3) which on a pin mounting (4) under axial spring bias is held rotationally fixed in the plug housing in a manner such that the pin mounting with a pulled-out plug is supported on a counter bearing (5) and on contact of the plug pin with a plug counter-piece is lifted from the counter bearing against the spring bias, wherein the pin mounting can be applied into the plug housing at different radial relative positions, wherein the pin mounting (4) is held rotationally fixed and axially displaceable in a sleeve (6) which is fastened on a cable-side housing terminal part (7) comprising a positioning section (8), and that the housing terminal part with the sleeve is applied into the plug housing (2), wherein the radial relative position on a complementary positioning section (9) on the plug housing (2) is fixed.

2. A plug part according to claim 1, wherein the sleeve (6) is snapped onto the housing terminal part (7) in a rotationally fixed manner.

3. A plug part according to claim 1, wherein the pin mounting (4) for the rotationally fixed mounting in the sleeve (6) comprises at least one guiding groove (10) which cooperates with a guide element (11) on the sleeve.

4. A plug part according to claim 1, wherein in the sleeve (6) between the support shoulder (12) on the pin mounting (4) and an end-face (13) of the housing terminal part (7) there is held a helical compression spring (14).

5. A plug part according to claim 1, wherein the sleeve (6) comprises latching means (15) which for securing the housing terminal part (7) in the selected relative position are latchable into the plug housing.

6. A plug part according to claim 5, wherein the plug housing (2) comprises at least two recesses (16) and that the latching means comprise a number of latching tongues (15) which corresponds to the number of possible relative positions of the housing terminal part (7), wherein in each relative position at least two latching tongues latch into the corresponding recesses.

7. A plug part according to claim 1, wherein the sleeve (6) is manufactured as a hollow-cylindrical bent part of metal.

8. A plug part according to claim 1, wherein the pin mounting (4) comprises a bearing section (17) formed as a truncated pyramid, and that the counter bearing (5) on the plug housing (2) is formed as a complementary hollow part, wherein the number of side surfaces of the truncated pyramid corresponds to the number of possible relative positions of the housing terminal part.

9. A plug part according to claim 8, wherein the base of the truncated pyramid forms an abutment (18) which for limiting the maximum possible spring path on the pin mounting (4) cooperates with the end-face (19) of the sleeve.

10. A plug part according to claim 1, wherein the positioning section (8) on the housing terminal part (7) is formed as a hexagon, wherein six radial relative positions of the pin mounting in the housing are possible.

11. A plug part according to claim 1, further comprising a protective flap (38) for protecting the end-face side (39) of the plug pin (3), said flap being pivotably and displaceably mounted on a guide path (40) in the plug housing (2) in a manner such that on inserting the plug part into a socket part, the plug is movable from a closure position at the end-face of the plug housing into an opening position displaced back relative to the end-face, and a guide element (41) fastened on the plug housing, said guide element defining the guide path for the protective flap.

12. A plug part according to claim 11, wherein the guide element (41) is a U-shaped bow which is snapped onto the plug housing (2) and at least partly surrounds this.

13. A method for assembling a plug part according to claim 1, said method comprising steps of providing the end of the fiber optic cable (33) with a pin mounting (4), assembling a cable terminal unit (26) consisting of pin mounting (4), sleeve (6), spring element (14) and housing terminal part (7), measuring the transmission damping at the end-face of the fiber optic at all possible radial relative positions of the cable terminal unit (26), marking the relative position with the lowest damping value on the cable terminal unit, and inserting the cable terminal unit (26) in the marked relative position into the plug housing.

* * * * *